United States Patent [19]

Stievenart et al.

[11] 4,167,673

[45] Sep. 11, 1979

[54] SHEET SQUARING DEVICE

[75] Inventors: Emile F. Stievenart, Hoboken; Hendrik S. Plessers, Boechout; Georges J. Neujens, Merksem, all of Belgium

[73] Assignee: AGFA-GEVAERT N.V., Mortsel, Belgium

[21] Appl. No.: 870,364

[22] Filed: Jan. 18, 1978

Related U.S. Application Data

[63] Continuation of Ser. No. 743,172, Nov. 19, 1976, abandoned.

[30] Foreign Application Priority Data

Nov. 20, 1975 [GB] United Kingdom ............... 47808/75

[51] Int. Cl.[2] .......................... G11B 1/04; B65H 1/00; B65H 9/06

[52] U.S. Cl. .................................... 250/468; 250/477; 271/18; 271/242; 271/244; 271/265; 271/272

[58] Field of Search ................. 271/18, 242, 265, 243, 271/244, 245, 246, 227, 228, 272, 273, 274, 10; 250/468, 477, 481

[56] References Cited

U.S. PATENT DOCUMENTS

| | | | |
|---|---|---|---|
| 2,247,134 | 6/1941 | Roethe | 271/243 X |
| 3,206,193 | 9/1965 | Allen et al. | 271/265 |
| 3,240,487 | 3/1966 | Templeton | 271/228 |
| 3,244,417 | 4/1966 | Dammeier | 271/227 |
| 3,891,854 | 6/1975 | Hura | 250/468 |
| 3,964,107 | 6/1976 | Stievenart et al. | 250/468 |

*Primary Examiner*—Bruce H. Stoner, Jr.
*Attorney, Agent, or Firm*—William J. Daniel

[57] ABSTRACT

A daylight cassette unloader comprises a mechanism for unlocking and opening a radiographic film cassette introduced therein, and mounted in inclined position so that after opening the film is permitted to slide out of the cassette. At the outlet of the unloader a supplementary mechanism is provided in order to align the film in such a way, that it is reproducibly fed to the inlet opening of a film processor. Preferably the latter mechanism comprises a pair of rollers which start rotating only after the impact of the film on one of the rollers.

3 Claims, 6 Drawing Figures

SHEET SQUARING DEVICE

This is a continuation, of Ser. No. 743,172, filed Nov. 19, 1976, now abandoned.

FIELD OF THE INVENTION

This invention relates to apparatus for automatically unloading radiographic film cassettes.

BACKGROUND OF THE INVENTION

Such unloading apparatus is used for example in conjunction with automatic film sheet processors in medical centres where large numbers of radiographs have to be processed each day. The cassettes containing exposed radiographic film sheets are placed in the unloading apparatus and this operates to unfasten and open the cassettes and to feed the film sheets into a processing machine in which the film sheets are automatically developed.

DESCRIPTION OF THE PRIOR ART

A known type of film sheet feeding device comprises a ramp sloping downwardly towards a pair of film sheet transporting rollers. In the cassette unloading apparatus each cassette is unfastened and opened. The film sheet is displaced from the cassette onto the ramp and slides down it to the transporting rollers. The leading edge of the film sheet enters the nip of the rollers and they feed the sheet from the unloading apparatus at predetermined speed.

It has been found that not every film sheet is delivered from the feeding device in proper manner. Due to unpredictably variable factors influencing the behaviour of the film sheets on leaving their cassettes, such as degree of frictional constraint, film sheets sometimes become incorrectly displaced and reach the feed rollers in a skewed condition. Such skewing of film sheets is undesirable. If the sheets are fed to a processing machine as above referred to, the skewing may result in incorrect progress of the film sheets through such machine or even to arrest of such progress. If the processing machine is equipped with mechanism for automatically controlling the supply of one or more processing liquids in dependence of a sensing device responsive to the passage of film sheets, the skewing of such sheets may result in faulty operation of such mechanism.

BRIEF DESCRIPTION OF THE INVENTION

It is an object of the present invention to provide an unloading apparatus which will more reliably deliver film sheets square with respect to their delivery path.

In accordance with the present invention, there is provided a radiographic film cassette unloading apparatus comprising means for locating a loaded cassette in predetermined position, a mechanism for unfastening and opening the cassette, means forming a film sheet pathway which slopes downwardly towards the nip of co-operating rotatable feed members for feeding the sheet between them and to a delivery point, such pathway being sufficiently inclined to allow a film sheet to descend therealong under gravity, means for causing transfer of a film sheet from the open cassette to such pathway to allow such descent of the film sheet, driving means for said feed members, and means for automatically initiating operation of said driving means to commence delivery of the film sheet by said feed members only after an interval of time following impact of the film sheet against such members, said time interval being sufficient to allow the film sheet, if it is skewed when such impact occurs, to become squared with respect to the delivery path under the turning movement imposed due to the eccentric abutment of the leading edge of said sheet against said members.

The rotatable feed members are preferably co-operating rollers. However co-operating rotating feed belts or analogous means may be used as an alternative.

The said feed members may be provided with driving means which during each cycle of the apparatus initially and temporarily drive said members in reverse sense, i.e., contrary to their film sheet delivering motion, so that such members tend temporarily to repel the film sheet. The repulsion force further contributes to ensure that the sheet is square when its delivery commences.

The initiation of the operation of the rotatable feed members, whether in reverse or straightway in film sheet delivery motion, may be dependent on operation of a switch which is arranged so that it is triggered by movement of a film sheet into a predetermined position along its inclined pathway to the feed members. For example a microswitch may be used having a contact arm in the descent path of the film sheet.

Means may be provided which automatically terminates drive of the feed members once the film sheet has passed from between them. For example, operation of such drive means may be dependent on activation of one or another of two switches which are actuated by a film sheet, such switches being spaced apart by a distance equal to or less than the length of a film sheet and being located one in front of and the other behind the said feed members reckoning along the film sheet path.

The cassette unfastening and opening mechanism can take any of a variety of forms. Suitable mechanisms are described in U.S. Pat. No. 3,964,107 and U.S. patent application Ser. No. 592,879, now U.S. Pat. No. 4,047,193, both by the Applicant. Further suitable mechanism are described and shown in the specification accompanying our co-pending U.S. patent application Ser. No. 742,636, now abandoned and replaced by continuation application Ser. No. 932,628, by the Applicant.

Transfer of a film sheet from the open cassette to the inclined pathway leading to the rotatable feed members may be effected, e.g. by a mechanical sheet transfer mechanism such as is described in U.S. Pat. No. 3,186,325 to Gevaert Photo-Producten N.V. As an alternative the unloading apparatus according to the present invention may be designed for locating a cassette in inclined position such that when the cassette is opened the film sheet falls out of the cassette under gravity. Apparatus which results in sheet transfer in that manner is described and showed in our aforesaid co-pending patent application Ser. No. 742,636. When apparatus according to the invention is designed for sheet transfer to take place in that manner, the means causing the sheet transfer can simply be the means for locating the cassette in a sufficiently inclined position.

Preferably, apparatus according to the invention is in the form of a unit which can be mounted as such at the entrance of a radiographic film sheet processing machine so that the rotatable feed members deliver the film sheets into such machine. The apparatus is preferably in the form of a unit having a light-tight housing comprising a door, shutter or analogous means via which access can be gained to the interior of the housing for inserting a loaded cassette and withdrawing the cassette after it has been unloaded. It is an advantage if the apparatus can be operated in daylight conditions. If the apparatus is a unit with a light-tight housing as before referred to the unit can be fitted to a film sheet processing machine installed in daylight or in a brightly illuminated room, e.g., in a medical operating theatre where the processed radiographs will be directly available for inspection. The aforesaid unit housing may have a separate film sheet passage, closable by a light-tight cover, via which a film can be fed (in the dark) directly into a said processing machine.

Although reference has been particularly made to the use of apparatus according to the invention in direct association with a film sheet processing machine, apparatus according to the invention can be used for other purposes, e.g., it can be used in combination with a magazine for temporarily storing exposed film sheets preparatory to bulk processing of the contents of the magazine.

BRIEF DESCRIPTION OF THE DRAWINGS

Certain embodiments of the invention, selected by way of example, are illustrated in the accompanying diagrammatic drawings, wherein.

Figure 1:
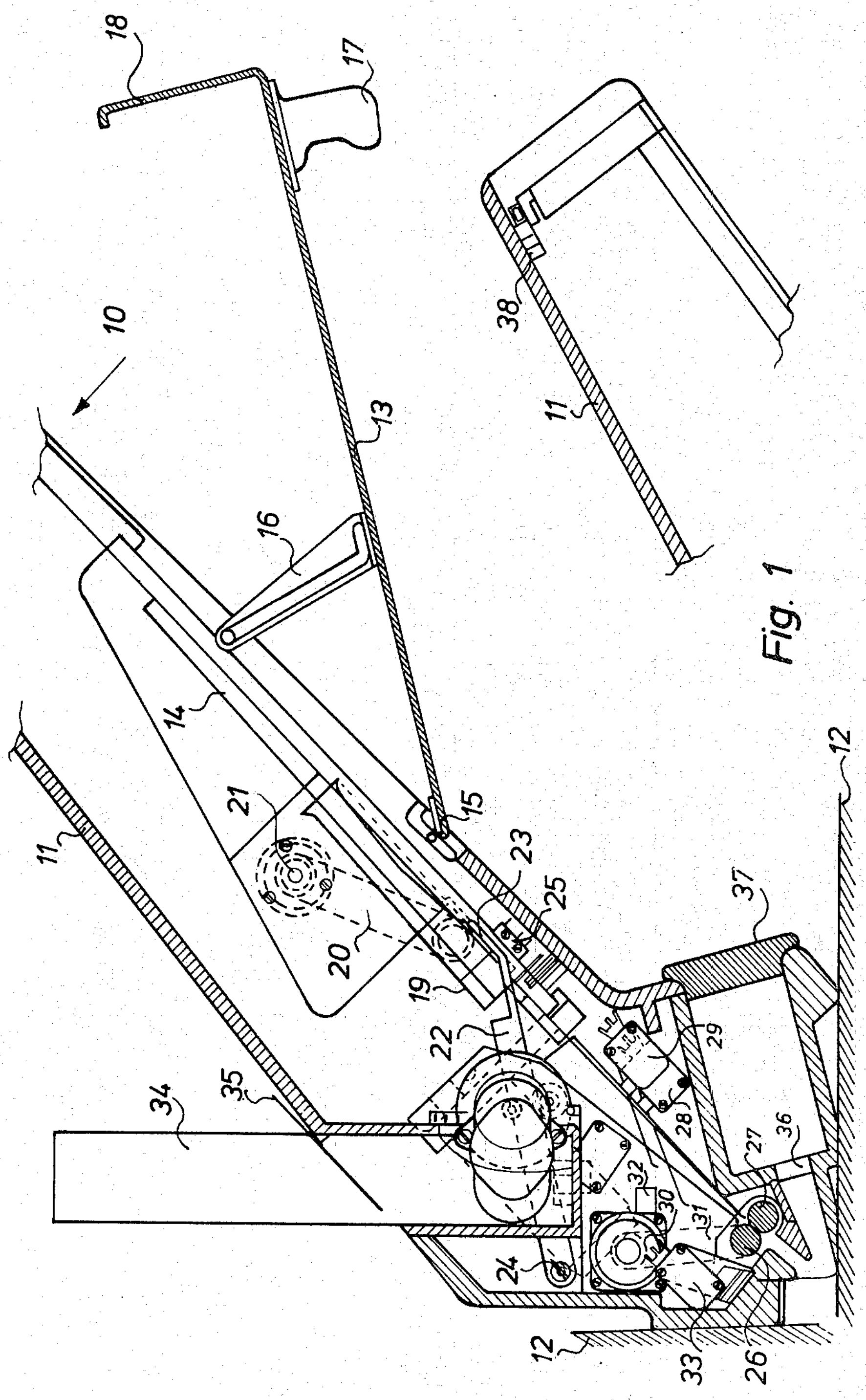
FIG. 1 is a cross-sectional view of an apparatus according to the invention.

The illustrated apparatus is designed for unfastening and opening radiographic film cassettes in daylight conditions and for feeding the film sheets from the open cassettes into the entrance slot of a processing machine.

DESCRIPTION OF THE PREFERRED EMBODIMENT

The apparatus 10 comprises a housing 11, fixedly secured by known means to the frontside of a processing machine 12 or of another device (not shown) for storing exposed radiographic films. The housing is provided with a hinged flap 13 which can be hinged upwardly from the illustrated position to close the housing light-tightly. The hinge component on the flap engages slots in the body of the housing so that the flap after being hingedly closed can receive a slight translational movement, imparted via its handle 17, for locking the flap. The flap is supported in its open position by a strut 16 having a slot in which a pin on the housing body engages.

Figure 3:
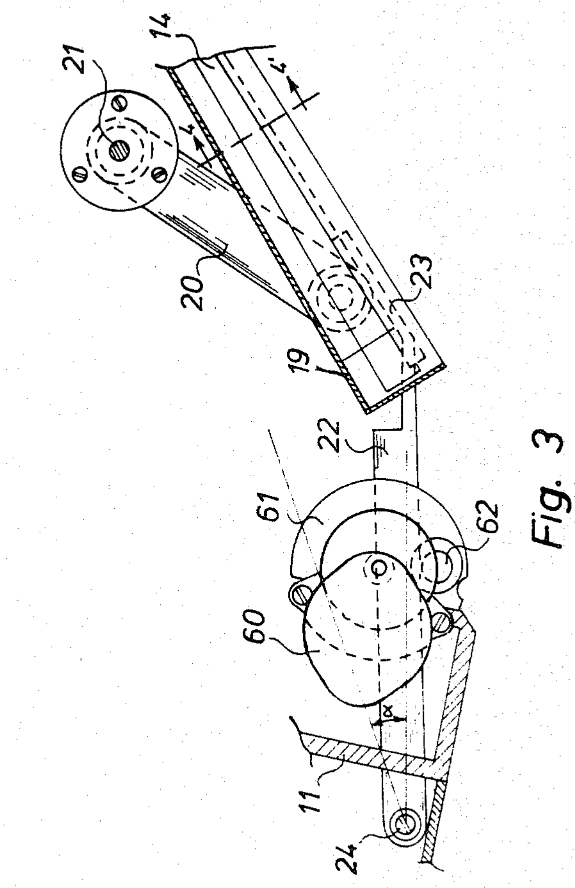
FIG. 3 is a view of the mechanism for opening a cassette.

In order to load the apparatus, a cassette containing a radiographic film sheet is inserted into a guide 19 located within the housing 11, the flap 13 of course being open. The cassette is inserted into the guide 19 front end first and in inverted orientation, i.e., with its lid facing downwardly. The front end of the cassette is the end where the cassette fastener(s) is or are located. As will become apparent from the later description the guide 19 serves a dual purpose. It locates the cassette in a predetermined lateral position within the housing of the apparatus, and it serves for holding and upwardly hinging the container portion of the cassette. As shown in FIGS. 1 and 3 the guide 19 is pivotally connected to an arm 20 which itself is freely rotatable around a shaft 21.

The cycle for unfastening, opening and unloading the cassette 14 is started when a hook portion 18 on the vertical rear wall of the flap 13 engages the actuating arm of microswitch 38. If desired, this start may be indicated by means of control signals (not represented) and the closing of the microswitch 38 may also actuate a supplementary locking mechanism for locking the housing flap closed and thus prevent accidental opening thereof.

Figure 2A:
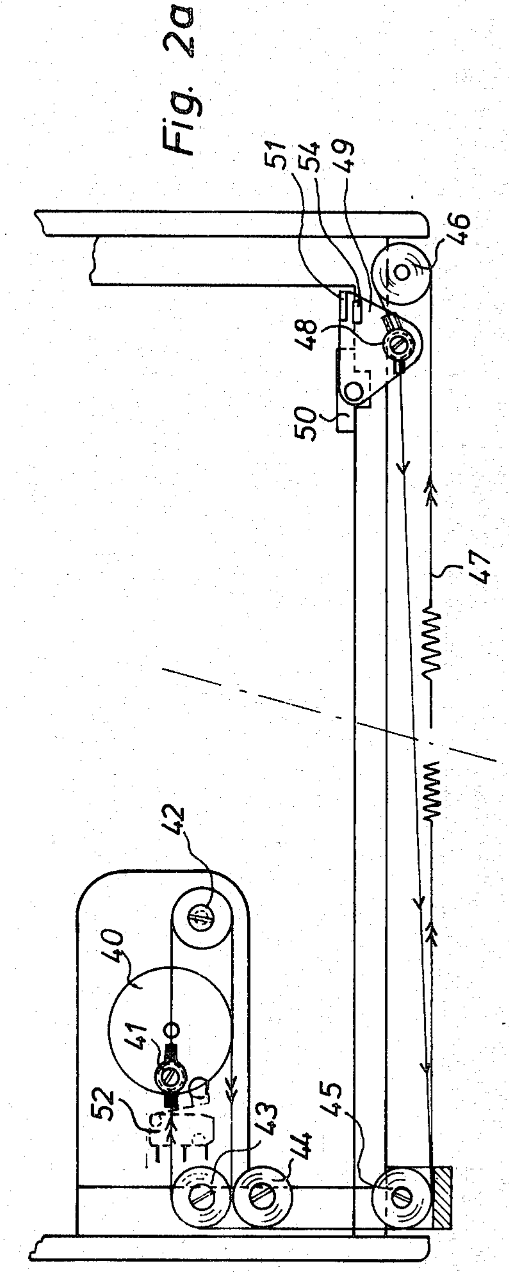
FIGS. 2*a* and 2*b* show part of the mechanism for unlocking a cassette.
Figure 2B:
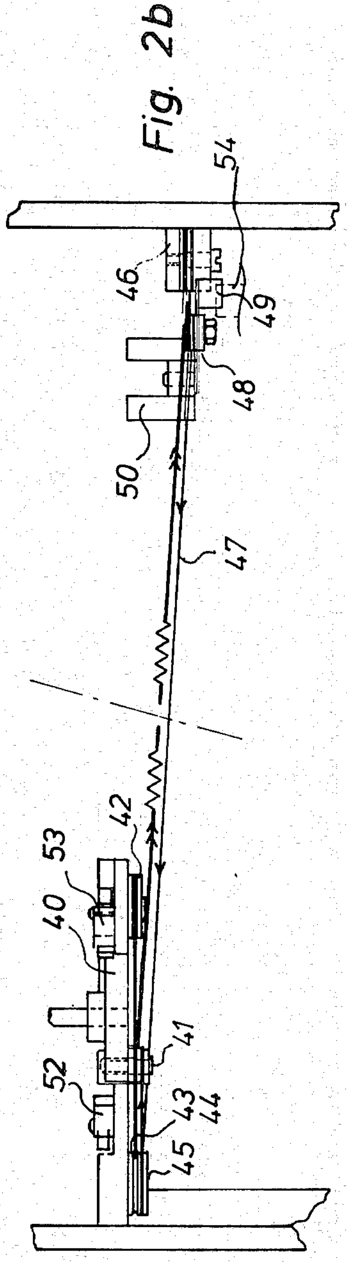

When the cassette is in correct position in the guide 19, the cassette engages the contact of a microswitch 25 in an operating circuit of a cassette unfastening mechanism. On commencement of the unfastening and opening cycle this unfastening mechanism is started and operates to release the cassette fastener(s). The details of this unfastening mechanism will be described later with reference to FIG. 2.

Once the cassette fastener(s) has or have been released a lever 22 having an end portion 23 is caused to swing upwardly about a shaft 24. The lever portion 23 engages the guide 19 and causes it to tilt upwardly as permitted by its aforesaid pivotal connection with shaft 21 via arm 20 and by the manner of its engagement with the container part of the cassette.

As the cassette is in an inclined position, the film sheet within the cassette falls out of it as the cassette is opened. The film sheet slides downwardly along the inside face of the cassette lid and travels on downwardly towards rollers 26 and 27 which will feed it through the entrance slot of a processing machine 12 a part of which is shown. During its descent the film engages the contacts of microswitches 28 and 29. One of these microswitches controls the rotation of a motor 30 which drives the rollers 26, 27 via a driving belt. The other microswitch activates an identification unit 34 functioning as described hereinafter.

When the film sheet reaches the nip of rollers 26, 27 they are stationary. The motor circuit includes a timer 32 which delays effective rotation of the rollers 26, 27 until a few seconds after the impact of the film sheet against such rollers. If the film sheet is skewed when it contacts the rollers it becomes squared before the resulting rotating movement of the rollers commences. Consequently it is ensured that the sheet is properly orientated in its own plane before it becomes advanced to the processing machine.

In a preferred embodiment of the apparatus, the time delay between impact of the film against the transporting rollers and the commencement of film advance by such rollers amounts to five seconds. If desired, the time switch 32 may be of a double cycle type and operates first to start the rollers rotating in reverse sense when the film sheet first contacts the rollers, then to stop the rollers and subsequently to start rotation of the rollers forwardly for propelling the film sheet into the processing machine. It will be appreciated that in the second case the chance of a film sheet being advanced by the rollers in skewed condition is even less than in the case the rollers are driven forwardly initially. Instead of the pair of rollers 26, 27 sheet transporting means of some other kind can be used, such as a pair of endless belts.

As the film sheet is driven forwardly by the rollers 26, 27 the leading end of the film sheet contacts the arm of a microswitch 33 which keeps the roller driving motor in operation until the trailing edge of the film sheet has passed. The apparatus is then ready for another feeding cycle. Microswitch 33 may also control release of the supplementary locking mechanism for the housing flap 13 so that this can be slightly retracted and hinged open to enable another cassette to be inserted into the apparatus. Each time a microswitch is actuated, signal means may be energized in order to enhance the ergonomic characteristics of the apparatus.

The identification unit 34 serves to print supplementary information upon the film sheets to be processed. The unit may comprise a flash unit, a small optical system and a holder for the original bearing the data to be printed, e.g., a card 35 bearing typewritten data. The released film sheet travels along the image plane of the optical system. The flash unit may be operated automatically when the leading edge of the film sheet contacts the arm of one of the microswitches 28 and 29 as already mentioned.

If desired, the apparatus 10 may be provided with a separate passageway 36 through which exposed film sheets may be directly fed into the processing machine from a darkroom. When using the apparatus in daylight or artificial light, the passageway 36 has to be screened off, e.g., by means of a cover 37.

Cassette Unfastening Mechanism

Figure 5:
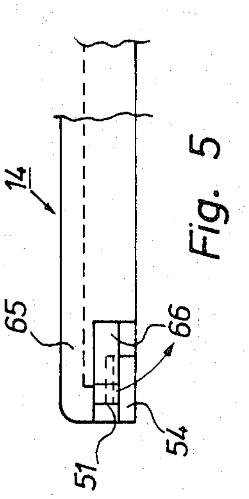
FIG. 5 shows a possible relationship between the cassette container, lid and fastening lever(s), and a member for unfastening the cassette.

In FIGS. *2a* and *2b* is represented the mechanism for unfastening the cassettes. This mechanism comprises a disc 40 driven by suitable motor means (not shown). The disc carries a pin 41 to which a flexible driving belt 47 is attached. (A cord or other suitable member may be used instead of a belt). The belt is supported by pulleys 42, 43, 44, 45 and 46 and is connected with a pin 48 provided to a rocker 49. The rocker 49 is pivotally mounted on a fixture 50 having an abutting lug 51. During a complete rotation of the disc 40, the rocker 49 is caused by virtue of its attachment to the belt 47 to oscillate about its pivot. The rocker first rocks clockwise in the aspect of FIG. *2a* so that the abutting lug 51 moves downwardly. Each cassette has a pivotable fastener-release lever (54 in FIG. 5) which when the cassette is in its inverted position has to be swung downwardly about its pivot in order to release the fastener. The location of the abutting lug 51 in the apparatus is such that when the cassette is inserted into the guide 19 (FIG. 1) as hereinbefore described the fastener-release lever passes below such lug as suggested in FIG. 5. During the clockwise movement of rocker 49 as above described, the lug 51 abuts against the fastener-release lever and moves it into its release position.

For the sake of simplicity, the apparatus chosen for illustration is one for unfastening and opening cassettes having only one fastener at its front end. The mechanism represented in FIGS. *2a* and *2b* extends transversely of the apparatus in front of the cassette guide 19 (FIG. 1) so that the position of lug 51 coincides with the single fastener. If the unfastening apparatus is required for handling cassettes with twin fasteners, e.g. one at or adjacent each front end corner of the cassette, two unfastening mechanisms as described with reference to FIGS. *2a* and *2b* will be provided, one for each fastener.

As appears from FIG. *2b*, two microswitches 52, 53 are located adjacent the disc 40. The actuating arms of these switches are contacted by the rim of the disc. This rim is formed with a recess or with recesses which when in register with a microswitch arm allow it to move to open or close the switch. In this manner one or more operations in the cycle of the apparatus can be controlled. For example switch 52 may operate to stop the disc motor after one complete revolution and switch 53 may initiate a next step in the cycle of the apparatus.

Cassette Opening Mechanism

Figure 4:
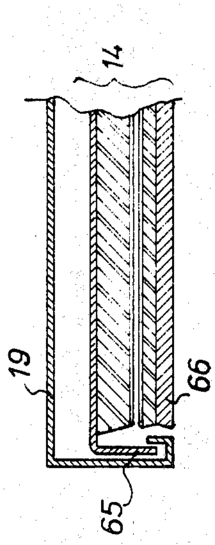
FIG. 4 is a cross-section on line 4—4' of FIG. 3.

The next step in the cycle is the opening of the cassette 14. As already mentioned the cassette guide 19 participates in this operation. As appears from FIG. 4, the guide 19 has a depending side wall at the bottom of which is an upwardly opening internal channel. When a cassette is pushed into the guide, the free edge of one side wall 65 of the container section of the cassette travels within the said internal channel. Between the side wall 65 and the closed cassette lid 66 there is sufficient clearance to accommodate to the inner side wall of the said channel. It will now be apparent that when the guide 19 is tilted upwardly by the action of lever 22 the guide will carry with it the container section of the cassette.

FIG. 3 shows how the lever 22 is operated. The lever is pivoted on a shaft 24 under the influence of a motor 60 which drives a disc 61, if desired through the intermediary of a reduction gear (not shown). On the disc 61 a support 62 is provided upon which the lever 22 rests. The support 62 may e.g., be in the form of a small roller in order to reduce friction between the lever 22 and the support 62 to a minimum. During one complete revolution of the disc 61, the lever 22 oscillates through a certain angle, the amplitude of its movement being sufficient to ensure that the container section of the cassette is raised far enough to allow unimpeded sliding movement of the film sheet out of the cassette.

We claim:

1. Unloading apparatus for a radiographic film sheet cassette which comprises means for locating in a predetermined unloading position a cassette loaded with a film sheet, said cassette having an open and a closed mode and including latching means for keeping the cassette fastened when in said closed mode, a mechanism for unfastening said latching means and opening the cassette when in said unloading position, a cooperating pair of normally stationary feed rollers adapted when rotatably driven in a given direction to feed the sheet between them and to a delivery point, means forming an uninterrupted film sheet pathway which begins adjacent said cassette unloading position and slopes downwardly towards and terminates adjacent the nip of said feed rollers, means for causing transfer of a film sheet from the open cassette onto such pathway, driving means operative when actuated to drive said feed rollers in said feeding direction, and means on said pathway at a point spaced upstream from said feed rollers for detecting the passage of said sheet by said point and for automatically activating said driving means in response to said detection to commence delivery of the film sheet by said feed rollers only after passage of a predetermined interval of time, said pathway having a length and inclination which is sufficient to cause a film sheet transferred thereto from said open cassette to descend freely therealong under force of gravity and to acquire by the time said descending sheet impacts against the nip of said pair of normally stationary feed rollers a momentum which is sufficient in the event said sheet is in skewed condition upon arrival at said roller nip to become squared with respect to said pathway under the turning movement created by its own momentum, said predetermined interval of time being sufficiently great to permit the leading edge of said descending sheet to reach said roller nip and to undergo said turning movement.

2. A radiographic cassette unloading apparatus according to claim 1, in which said time interval between the impact of the film against said feed members and the initiation of the operation of the latter equals about 5 seconds.

3. A radiographic cassette unloading apparatus according to claim 1, in which said driving means for said feed rollers initially and temporarily drive said rollers in a direction opposite to their film sheet delivering direction, so as to temporarily repel said film sheet from said roller nip.

* * * * *